Figure 1:
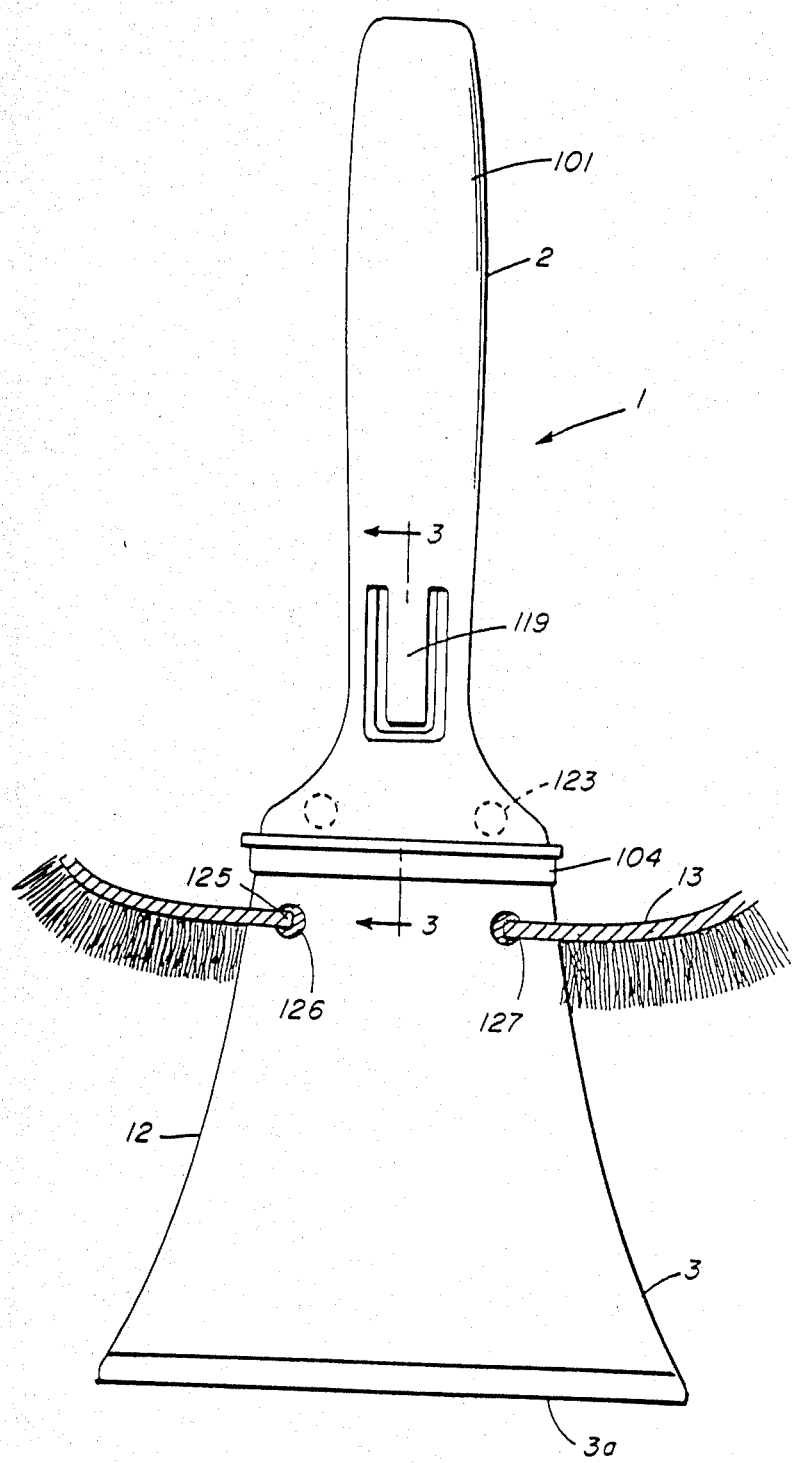

United States Patent [19]
Hopkins

[11] Patent Number: 4,770,712
[45] Date of Patent: * Sep. 13, 1988

[54] METHOD AND APPARATUS FOR SCRAPING ICE AND SNOW AND ILLUMINATING A SCRAPING AREA

[75] Inventor: Evan L. Hopkins, Emporia, Kans.

[73] Assignee: Hopkins Manufacturing Corporation, Emporia, Kans.

[*] Notice: The portion of the term of this patent subsequent to May 5, 2004 has been disclaimed.

[21] Appl. No.: 3,489

[22] Filed: Jan. 15, 1987

Related U.S. Application Data

[63] Continuation of Ser. No. 841,242, Mar. 19, 1986, Pat. No. 4,662,947.

[51] Int. Cl.⁴ .............................................. B08B 7/00
[52] U.S. Cl. ............................................ 134/6; 134/8; 15/105; 15/236.1; D32/49
[58] Field of Search .................. 134/6, 18; 15/236 R, 15/105; 362/119, 120; D32/49

[56] References Cited

U.S. PATENT DOCUMENTS

4,662,947  5/1987  Hopkins .................................. 134/6

Primary Examiner—H. M. S. Sneed
Assistant Examiner—Sharon T. Cohen
Attorney, Agent, or Firm—Lahive & Cockfield

[57] ABSTRACT

An ice/snow scraping apparatus and method characterized by an edge-illuminated, light transmitting scraping blade which provides illumination for the interior and scraping edge of a blade, thereby illuminating at least a portion of an area to be scraped from the blade illumination phenomena.

3 Claims, 2 Drawing Sheets

METHOD AND APPARATUS FOR SCRAPING ICE AND SNOW AND ILLUMINATING A SCRAPING AREA

This is a continuation of application Ser. No. 841,242, filed Mar. 19, 1986, now U.S. Pat. No. 4,662,947.

OBJECTS AND BRIEF SUMMARY OF INVENTION

The major object of the present invention is to provide an improved method and apparatus for scraping ice snow from a surface such as a vehicle windshield.

The invention is intended to provide an improvement in the ice scraping art in relation to such exemplarary prior accomplishments as those set forth in the following previously issued patents:

| U.S. Pat. No. | Inventor | Issue Date |
| --- | --- | --- |
| Des 246,414 | Hopkins et al | November 22, 1977 |
| 4,040,140 | Hopkins et al | August 9, 1977 |
| 4,141,111 | Hopkins et al | February 27, 1979 |
| 4,164,801 | Thomas | August 1, 1979 |
| 4,275,476 | Hopkins et al | June 30, 1981 |
| 4,458,320 | Batt | September 3, 1985 |

The primary objective of the present invention is to improve the ice and snow scraping art by affording a scraping apparatus and method by means of which convenient and affective work facilitating illumination of a scraping edge and scraping work area may be provided.

It is recognized that the broad concept of incorporating a light source with a cutting device or other tool has heretofore been considered, as evidenced by the following prior patent disclosures:

| U.S. Pat. No. | Inventor | Issue Date |
| --- | --- | --- |
| 1,369,378 | Berberian | February 22, 1921 |
| 1,890,841 | Brown | December 13, 1932 |
| 1,988,379 | Gilles | January 15, 1935 |
| 2,242,536 | Montgomery | May 20, 1941 |
| 2,466,342 | Watts | April 5, 1949 |
| 4,305,118 | Paquette | December 8, 1981 |

It has also been recognized in the art that various types of auxiliary mechanisms may be incorporated with scraping tools, as evidenced by the following prior patents:

| Patent | Inventor | Issue Date | Combined Feature |
| --- | --- | --- | --- |
| 2,676,348 | Brody et al | April 27, 1954 | Coin Holder |
| 2,700,096 | Clements | January 18, 1959 | Heater |
| 4,481,690 | Simmons | November 13, 1984 | Key Case |

None of the foregoing patents contemplate or suggest the concept of the present invention which entails the achievement of unique scraper illumination by effecting edge illumination of a light transmitting scraper blade so as to illuminate the interior and scraping edge of the blade, with such illumination being transmitted to an at least partially illuminating an area being scraped and at least a portion of this area beneath the body of the scraping blade.

In achieving the basic objectives of the present invention, method and apparatus concepts are presented as follows:

An apparatus for scraping ice and snow from a surface such as an vehicle windshield is contemplated, which apparatus comprises:

handle means operable to be gripped by a user;

light transmitting blade means extending from this handle means;

light transmitting scraping edge means at an outer portion of the blade means;

light source means supported by the handle means and including electric power source means, electric light bulb means, and switch means selectively operable, in response to operation by the hand of the user, to electrically connect the power source means and light bulb means and cause illumination of the light bulb means; and blade edge illumination means including a non-scraping blade edge means contained within the handle means and exposed to the light bulb means, and means mounting the light bulb means for the transmission of light to the non-scraping blade edge means. The switch means above noted is operable to cause illumination of the light bulb means, with the illumination of the light bulb means causing illumination of the interior of the light transmitting blade means and the light transmitting scraping edge means.

Illumination from the light bulb means is transmitted through the interior of said light transmitting blade means to the scraping edge means, with such transmitted illumination illuminating the interior of the light transmitting blade means so as to illuminate at least a portion of an area between the body of the blade means and a surface being scraped and, illuminating a portion of the surface immediately adjacent the scraping edge means.

The main apparatus as described above may further include:

shroud means at least partially surrounding the handle means and providing access to the switch means by the hand of the user, and means shielding the switch means from ice and snow during scraping operation of the apparatus.

The main method aspect of the invention for scraping ice and snow from a surface such as an vehicle windshield, comprises:

providing handle means operable to be gripped by a user;

providing light transmitting blade means extending from the handle means;

providing light transmitting scraping edge means at an outer portion of the blade means;

providing light source means supported by the handle means and including electric power source means, electric light bulb means, and switch means selectively operable, in response to operation by the hand of the user, to electrically connect the power source means and light bulb means and cause illumination of the light bulb means;

providing blade edge illumination means including
  a non-scraping blade edge means contained within the handle means and exposed to the light bulb means, and
  means mounting the light bulb means for the transmission of light to the non-scraping blade edge means;

operating the switch means to cause
  illumination of the light bulb means, with the illumination of the light bulb means causing
    illumination of the interior of the light transmitting blade means and the light transmitting scraping edge means; and
  transmitting illumination from the light bulb means through the interior of the light transmitting blade means to the scraping edge means, with such transmitted illumination
    illuminating the interior of the light transmitting blade means so as to illuminate at least a portion of an area between the body of the blade means and a surface being scraped and,
    illuminating a portion of the surface immediately adjacent the scraping edge means.

The main method as described in above may be supported by providing shroud means at least partially surrounding the handle means, with this shroud means
  providing access to the switch means by the hand of the user, and
  shielding the switch means from ice and snow during scraping operation of the apparatus.

The apparatus and method aspects of the invention having been summarized, it is now appropriate to give further consideration (but not by way of limitation of the invention) to a presently preferrred embodiment as illustrated in the appended drawings and discussed in the subsequent detailed description.

BRIEF DESCRIPTION OF DRAWINGS OF PREFERRED EMBODIMENT

In describing the present invention for information purposes, but not by way of limiting the scope of the invention, reference will be made to a presently preferred embodiment as illustrated in the appended drawings.

Figure 2:
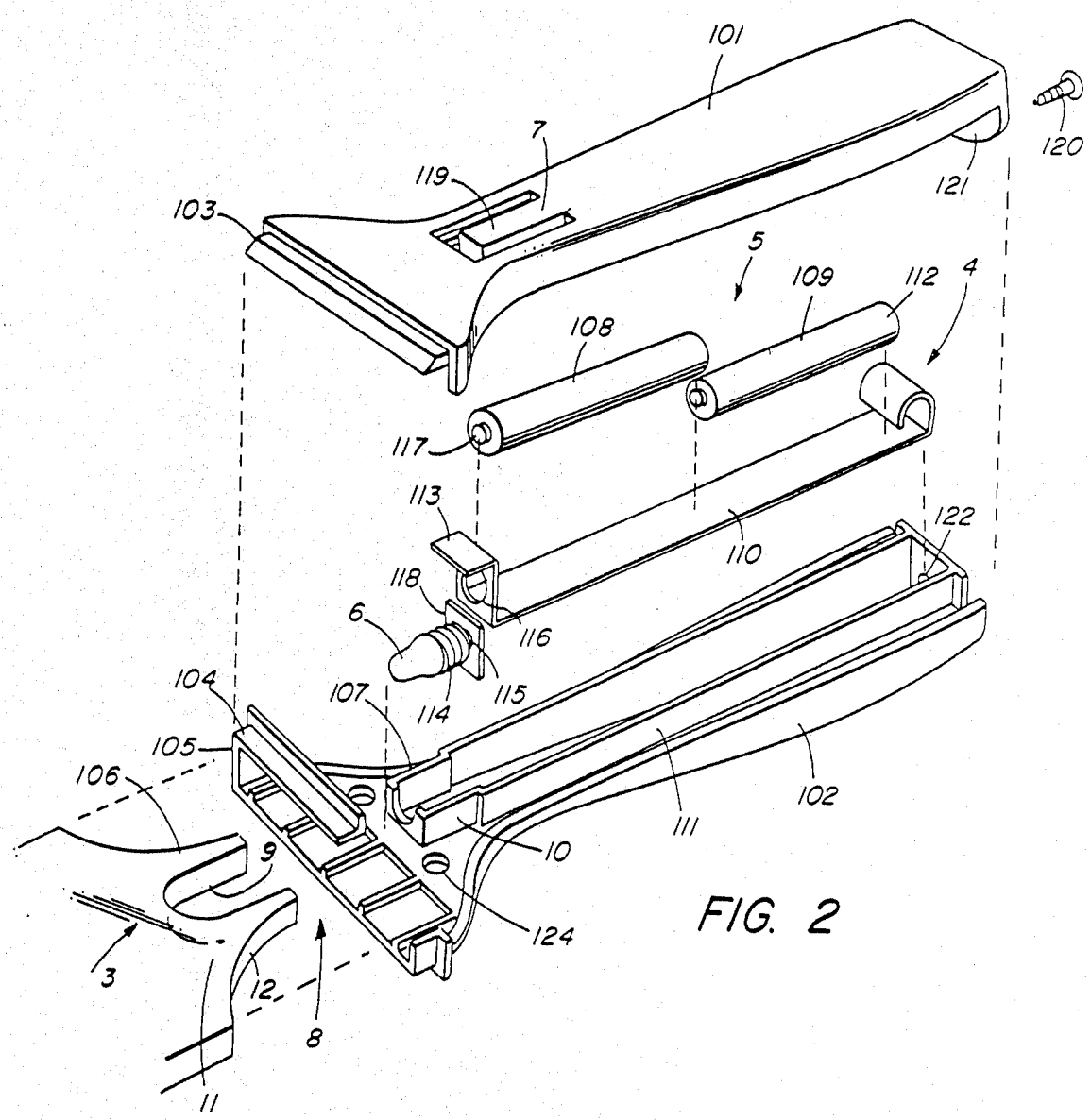
Figure 3:
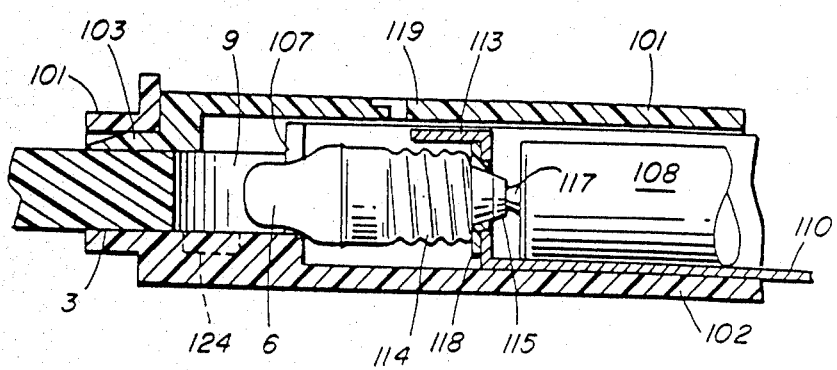

In the drawings:

FIG. 1 provides a top plan view (partially fragmentary) of an ice scraper apparatus of the present invention; and FIG. 2 provides an exploded, perspective view of separated components of the ice scraping apparatus of the present invention, illustrating their general functional and positional interrelationships; and FIG. 3 provides a fragmentary sectional view of FIG. 1, as viewed along line 3—3 of FIG. 1.

Having described the general content of the appended drawings relating to a presently preferred embodiment of the invention, reference will now be made to a more detailed description of this embodiment.

DESCRIPTION OF PRESENTLY PREFERRED EMBODIMENT OF INVENTION

As shown in FIG. 1, FIG. 2, and FIG. 3, implementation of the present invention involves the use of an apparatus 1 such as that shown in these drawings.

The apparatus 1 for scraping ice and snow from a surface such as a vehicle windshield, includes a handle means 2 operable to be gripped by a user and a light transmitting blade means 3 extending from this handle means 2.

A light transmitting scraping edge means 3a is disposed at an outer portion of the blade means 3. A light source means 4 is supported by and within the handle means 2 and includes electric power source means 5, electric light bulb means 6, and switch means 7. Switch means 7 is selectively operable, in response to operation by the hand of the user, to electrically connect the power source means 5 and the light bulb means 6 and cause illumination of the light bulb means 6.

Apparatus 1 further includes blade edge illumination means 8 comprising a non-scraping blade edge means 9 contained within the handle means 2 and exposed to the light bulb means 6, as well as means 10 mounting the light bulb means for the transmission of light to the non-scraping blade edge means 9.

STRUCTURAL DETAILS

As shown in FIG. 2, handle means 2 comprises mating half-sections 101 and 102, with section 101 including a lip-like securing ledge 103 operable to be received between a ledge portion 104 of handle section 102. Ledge 104 is provided by a generally rectangular frame-like portion 105 of handle portion 102 which defines an aperture for telescopingly receiving a portion 106 of blade 3. Telescoping portion 106 passes through the opening of frame portion 105 and extends telescopingly over a bulb receiving socket 107, as shown in FIGS. 2 and 3.

Blade 3 is fabricated from transparent, or translucent, light transmitting plastic of the type commonly employed in ice scrapers of the type delineated at the outset of this disclosure.

The electric power source 5 may comprise a pair of conventional batteries 108 and 109 which may be of the "AAA" type. Batteries 108 and 109 are disposed in series connected within a spring-like metal spring socket 110, which socket 110 is disposed in a receptacle portion 111 of body section 102. Battery receiving spring means 110 is electrically conductive in nature and provides an electrically conductive path from the negative terminal 112 of battery 109 to a flexible switch-lip 113. The threaded portion 114 of bulb 6 has a terminal end 115 which passes through an opening 116 in spring member 110 into electrical connecting engagement with the positive terminal 117 of battery 108. An insulating washer-like paper or plastic or cardboard member 118 is mounted on the threaded portion 115 of bulb 6 so as to insulate the bulb and its electrical contact 115 and its threaded portion 114 from the metallic strip 110.

With this arrangement, the completed electrical connection between the batteries and the bulb 6 is not completed until the switch-strip 113 is deflected downwardly into contact with the threaded portion 114 of bulb 6 (the bulb 6 being securely received within the socket 107). This selectively operable downward deflection of the resilient switch tang 113 is caused by an operator's engaging a downwardly deflectable switching tab 119 formed in body portion 101. With a users hand inserted into the muff 13, the thumb of the user may engage the tang 119 and depress it downwardly so as to cause the conductive switch tab 113 to engage the threaded portion 114 of bulb 6, complete the electrical connection between the battery assembly and the bulb, and cause the bulb 6 to be illuminated.

With the bulb 6 illuminated, light is transmitted directly through the opening defined by body frame portion 105 into the non-scraping, light receiving end 106 containing the non-scraping edge means 9. Socket 107 of mounting means 10, as shown in FIGS. 2 and 3, so secures and mounts bulb 6 as to cause this light to be transmitted longitudinally into the edge or end portion 9 of blade 9 where it is then transmitted longitudinally through the interior 11 of the blade 3 to the scraping edge 3a. This transmitted light thus illuminates the scraping terminus 3a of the blade and the adjacent surface being scraped by this terminus and also provides illumination between the body 12 of the blade and the underlying surface being scraped.

As will be appreciated, the light and battery assembly are held in place by assembly of the portions 101 and 102. This assembly is effected by inserting the tang 103 underneath the ledge 104 and then securing the outward ends of the handle sections 101 and 102 by a threaded fastener 120 which passes through and opening in the end 121 of handle portion 101 into a securing socket 122 and the end of handle portion 102.

The assembly of portions 101 and 102 is effected after the end portion 106 of blade 3 is telescopingly inserted into the socket 105 into mating engagement with the light bulb socket 107, with lip 103 providing a locking plate between the top of the blade 3 and the underside of ledge 104 as shown in FIG. 3. Blade 3 is may be secured within the handle by way of suitable detent arrangements such as pins or stubs 123 projecting from the underside of the blade 123 into socketed engagement with sockets or recesses 124 formed in handle 102 as generally depicted in FIGS. 1 and 2.

As is shown in FIG. 1, by way of example, a neck-like opening 125 formed at the end of the shroud 13 which is mounted on the scraper may be socketed in groove or recess portions 126 and 127 extending laterally inwardly from opposite sides of the blade 3, as generally shown in FIG. 1.

Blade 3, on its underside, may have bas-relief, etched design means. The edge illumination of the blade 3, in being directed edgewise of such a design, will produce unusually attractive, illumination enhancement of edge portions of such a design.

Blade 3 may be curved or flat, flaired, laterally outwardly diverging, or of other configuration and/or may be provided with ice-breaking ridges, etc. Scraping edge 3a may be continuous or divided transversely into separate segments or fingers.

A muff-like shroud means 13, generally as described in the aforesaid Batt U.S. Pat. No. 4,458,320, may at least partially surrounding the handle means 2 and provide access to the switch means 7 by said hand of said user, and shield the switch means 7 from ice and snow during scraping operation of said apparatus 1.

The disclosure of the aforesaid Batt patent is herein incorporated by reference insofar as it generally depicts the mounting of a muff or mit like shroud on an ice scraper with this mitt shielding the ice scraper handle and a user's hand gripping the handle 2 within the shroud means 13. As will be apparent from FIG. 1, shroud 13 is illustrated only in fragmentary, sectional format.

EDGE ILLUMINATION AND SCRAPING METHOD

With the apparatus as theretofore described, a unique blade edge and scraping area illumination is able to be achieved in connection with ice and snow scraping operations in the following described manner.

By operating the switch means 7, illumination of the light bulb means 6, is caused. This illumination of the light bulb means 6 causes illumination of the interior 11 of the light transmitting blade means 3 and the light transmitting scraping edge means 3a.

Illumination is transmitted from the light bulb means 6 through the light transmitting interior 11 of the light transmitting blade means 3 to the scraping edge means 3a. This transmitted illumination illuminates the interior 11 of the light transmitting blade means 3 so as to illuminate at least a portion of an area between the body 12 of the blade means 3 and a surface being scraped. It also illuminates a portion of the surface immediately adjacent said scraping edge means 3a.

OVERALL SUMMARY, NONOBVIOUSNESS, AND SCOPE OF INVENTION

The overall nature of a presently preferred embodiment of the invention has been set forth, by way of example only and not by way of limitation, in the preceding description. The invention, as such, is intended to be delineated by the scope of the appended apparatus and method claims.

Prior art such as that identified at the outset of this disclosure fails to disclose of suggest the unique edge illumination, ice/snow scraper concept of the present invention and thus attests to the non-obviousness of the invention.

In describing the presently preferred embodiments of the invention, those skilled in the ice/snow scraping art and familiar with the disclosure of the prior art and this present invention may well recognize additions, deletions, substitutions, modifications, equivalent or other arrangements which would fall within the scope of the invention which is deemed to be set forth in the appended claims.

What is claimed is:

1. A method for removing ice and snow and any combination thereof from a windshield, comprising:
    providing scraper handle means;
    providing blade means having a scraping end and a non-scraping end, said non-scraping end being secured to said handle means;
    providing selectively operable illumination means comprising a power source and a light source, said illumination means mounted within said handle means and adapted to direct light through said blade means; and
    scraping ice, snow or any combination thereof from a windshield utilizing the blade means while said illumination means is activated.

2. A scraping apparatus for removing ice and snow and any combination thereof from windshields, comprising
    a handle means;
    a translucent blade means having a scraping end and a non-scraping end, said non-scraping end being secured to said handle means; and
    selectively operable illumination means comprising a power source and a light source, said illumination means mounted within said handle means and adapted to direct light through said blade means.

3. Apparatus of claim 2 wherein said illumination means is selectively operable through a switch means mounted on said handle means which electrically connects the power source and light source to illuminate the light source.

* * * * *